United States Patent
Reiter

(10) Patent No.: US 6,564,923 B2
(45) Date of Patent: May 20, 2003

(54) SEPARATING DEVICE

(75) Inventor: Christian Reiter, Pohlheim (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/933,187

(22) Filed: Aug. 20, 2001

(65) Prior Publication Data
US 2002/0050440 A1 May 2, 2002

(30) Foreign Application Priority Data
Sep. 6, 2000 (DE) .......................... 200 15 407

(51) Int. Cl.⁷ .......................................... B65G 47/14
(52) U.S. Cl. ........................................ 198/396; 221/204
(58) Field of Search ............................... 198/389, 390, 198/396; 221/171, 200, 202, 204, 264

(56) References Cited

U.S. PATENT DOCUMENTS

| 4,033,441 A | * | 7/1977 | Pataki | 193/38 |
| 4,365,445 A | * | 12/1982 | Watson | 193/2 R |
| 4,440,286 A | * | 4/1984 | Saxon | 198/380 |
| 4,450,948 A | * | 5/1984 | Naito et al. | 198/389 |
| 4,732,296 A | | 3/1988 | Heck et al. | |
| 4,828,142 A | * | 5/1989 | McKnight | 221/171 |
| 4,905,842 A | * | 3/1990 | Habele et al. | 209/556 |
| 5,392,954 A | | 2/1995 | Gartz | |
| 5,542,524 A | * | 8/1996 | Sakoda | 198/409 |
| 5,913,428 A | * | 6/1999 | Graham | 198/380 |
| 6,105,753 A | | 8/2000 | Graham | |

FOREIGN PATENT DOCUMENTS

GB 2241685 9/1991

* cited by examiner

Primary Examiner—Christopher P. Ellis
Assistant Examiner—Richard Ridley
(74) Attorney, Agent, or Firm—Edward D. Murphy

(57) ABSTRACT

A separating device for connection to a rotating magazine. The separating device transports rivets (3) via a conveyor duct (6) formed by three limiting faces. The first limiting face is a base plate (5), the second limiting face is a right-hand guide segment (1) and the third limiting face is a left-hand guide segment (2). At least one of the guide segments is designed and arranged to be excited and oscillate to avoid jamming of rivets (3) in the conveyor duct (6).

3 Claims, 5 Drawing Sheets

SEPARATING DEVICE

BACKGROUND OF THE INVENTION

The subject of the present invention is a separating device suitable for connection to a rotating magazine, consisting at least of a conveyor duct for transporting rivets, wherein a first limiting face of the conveyor duct is formed by a base plate; a second limiting face of the conveyor duct is formed by a right-hand guide segment, and a third limiting face is formed by a left-hand guide segment.

In the prior art, it is known to provide a conveyor duct formed by the guide segments and base plates that are rigid in design, i.e. the cross-sectional profile of the conveyor duct is formed, for example, in a T-shape for punch rivets by rigidly fastened limiting faces. The limiting faces are conventionally formed by guide segments, wherein the guide segments are fastened to the base plate by means of a plurality of fastening elements. With the aid of a rotating magazine connected directly to the entrance region of the conveyor duct, rivets are introduced into the conveyor duct in a particular orientation and are brought to an end point due to the gravitational force in the conveyor duct so as to be transported there to a desired position via a slider system. Individual rivets can wedge in the transport path through the conveyor duct due to tolerances between the rivet size and the size of the conveyor duct cross-section, so the transport of rivets is stopped within the conveyor duct. A transport stoppage of this type is particularly disadvantageous as it may be necessary to release the individual guide segments from their fastening to remove the wedging. Effort of this type for disassembly is not only time-consuming but also technically complicated due to the numerous individual parts.

SUMMARY OF THE PRESENT INVENTION

It is the object of the present invention therefore to provide a separating device which significantly reduces the risk of rivets wedging in the conveyor duct.

It is another object of the present invention to provide a separating device that will oscillate one or more of its components, as needed, so as to release any wedged rivets.

Due to the oscillating ability of at least one guide segment, preferably the left-hand guide segment, the conveyor duct, preferably T-shaped in cross-section, is not and does not remain rigid in design, but, due to the oscillation of a segment, preferably the left-hand guide segment, its cross-sectional area continuously alters slightly when the slider of the conveyor duct pushes the last rivet in each case out of the conveyor duct at the exit region. By introducing the oscillation into the at least one, preferably left-hand guide segment, wedging of rivets inside the conveyor duct is released and continuous movement in the exit direction of the conveyor duct caused by the gravitational force is thus assisted.

The oscillation is preferably introduced into the left-hand guide segment by mechanical means. It is also conceivable to introduce an oscillation into at least one guide segment electronically and, for example, this can be brought about by a piezoelectric element which is designed and arranged so as to allow the conveyor duct to oscillate.

In the present invention, a mechanical means is used, consisting of a friction face with a corrugated surface profile and integrated on the slider and also having a pin mounted on a helical spring, wherein the pin is designed and arranged in such a way that, as a result of a longitudinal movement of the slider and therefore of the friction face, the pin is moved over the corrugated surface profile and an oscillation is thus introduced into at least one, preferably left-hand, guide element.

The slider is expediently arranged at the entrance region of the conveyor duct and receives the last rivet in each case into a gap and transports it preferably perpendicularly to the conveyor duct axis into a further region in order to transport the rivet aligned in the predetermined position for further use.

Directly downstream of a recess in the slider into which the rivet is introduced for transport, a friction face with a corrugated surface profile is preferably arranged on which friction face the mechanical means located in at least one, preferably the left-hand, guide segment rests and is moved by the longitudinal slider movement of the slider. This mechanical means inside the at least one, preferably right-hand, guide segment is formed, in a preferred embodiment, by a pin biased by means of a spring in a blind hole and, as a result of this bias, rests with a certain force on the friction face with the corrugated surface profile. Due to the longitudinal movement of the slider, the point of the pin is guided along the profile, so the point travels the contour profile in each case and is thus made to oscillate, the oscillation, in turn, being transmitted to the at least one, preferably left-hand, guide segment.

It would also be possible for the present invention to have an embodiment (not shown) in which the surface profile of the friction face is not corrugated in design, but has peaks or a curved profile (for example involutes). The only crucial factor in the design of the surface profile is that, as a result of the mechanical contact of a movable means inside at least one, preferably the left-hand guide segment, oscillation is introduced therein.

BRIEF DESCRIPTION OF THE ACCOMPANYING DRAWINGS

The present invention will be described in detail hereinafter by means of a preferred embodiment with reference to the drawings, in which.

DETAILED DESCRIPTION OF THE INVENTION

Figure 1:
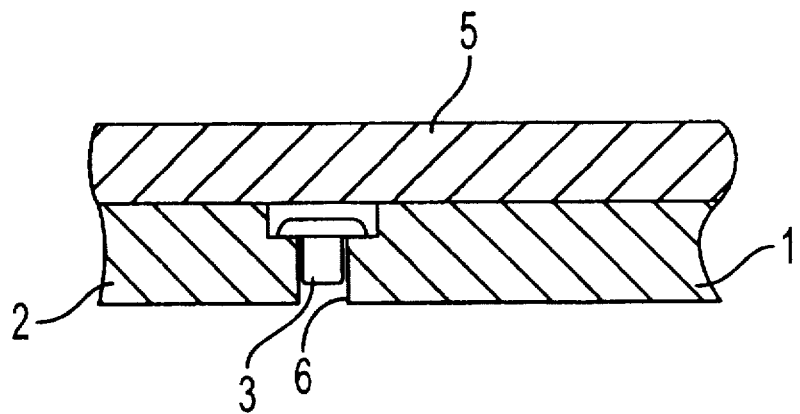
FIG. 1 is a cross-section through a conveyor duct of a separating device according to the present invention with an unwedged rivet.
Figure 2:
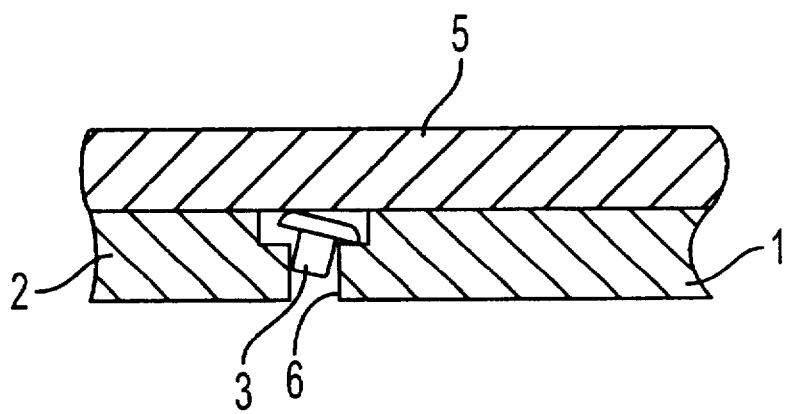
FIG. 2 is a cross-section through a conveyor duct of a separating device according to the present invention with a wedged rivet.

FIG. 1 is a schematic cross-section through the conveyor duct with a rivet which is transported through the conveyor duct in an unwedged state. FIG. 2 shows a cross-section of the conveyor duct of the separating device according to the present invention according to FIG. 1, wherein the rivet is wedged, however, inside the conveyor duct and therefore cannot be transported on. FIGS. 1 and 2 also show in section the base plate 5 and the right-hand segment 1 and the left-hand segment 2 of the guide elements spaced from each other to form a conveyor duct 6 therebetween.

Figures 3, 3A:
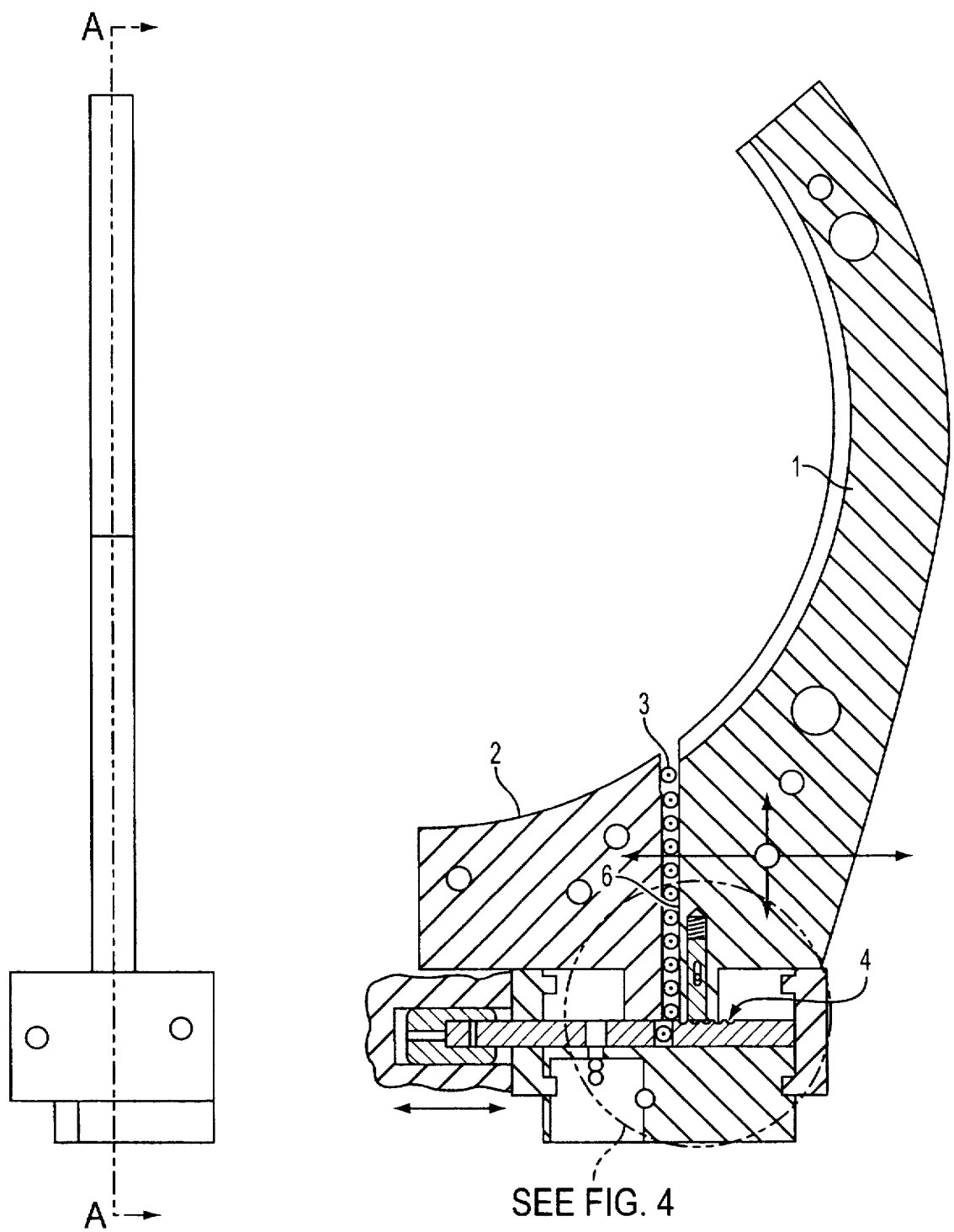
FIG. 3 is a front elevational view of the separation device of the present invention.
FIG. 3A is a view taken along line A—A showing a cross-section through a separating device illustrated in FIG. 3, and is an enlarged view of the phantom-lined section of FIG. 3A.

FIG. 3 is a front view of the separation device according to the present invention, while FIG. 3A is a cross-section of the separating device according to the present invention, wherein a large number of rivets 3 are shown in the conveyor duct 6. The guide elements 1 and 2 and their connection region are also shown on a rotating magazine.

Figure 4:
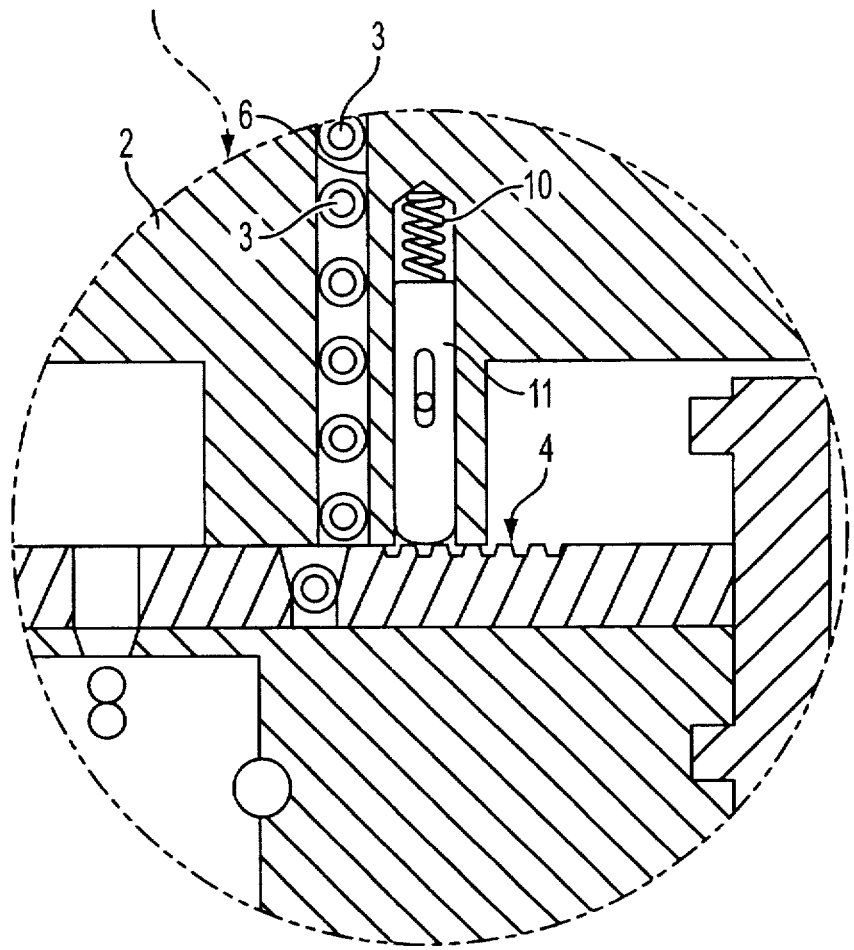
FIG. 4 shows a further cross-sectional view of the separating device at the rivet feed according to the present invention illustrated in FIG. 3A.

FIG. 4 shows a detail of the separating device according to the present invention according to FIGS. 3 and 3A, wherein a rivet 3 is received by a slider and is transported with a longitudinal movement by an oscillating means (not shown). The slide has a corrugated face or ribs 4 positioned immediately below a projection or pin 11 located in the right-hand guide segment 1. This is arranged directly next to the conveyor duct 6 and forms a mechanical means 11 consisting of the pin 11 which is biased by a helical spring 10 in such a way that it rests with force on the friction face 4 with a corrugated surface profile located underneath. During a longitudinal movement of the slider the friction face 4 with corrugated surface profile is guided past the point region of the pin 11 and optionally pushes it upwards by a certain amount. With the subsequent further movement of the slider, the pin 11 is pressed into a trough of the surface profile due to the bias. With a swift longitudinal movement due to operation, there occurs, as a result of the pin's 11 travel over the corrugated profile, an oscillation which, according to the invention, prevents or releases a possible wedging of the rivets 3 in the conveyor duct 6.

Figure 5:
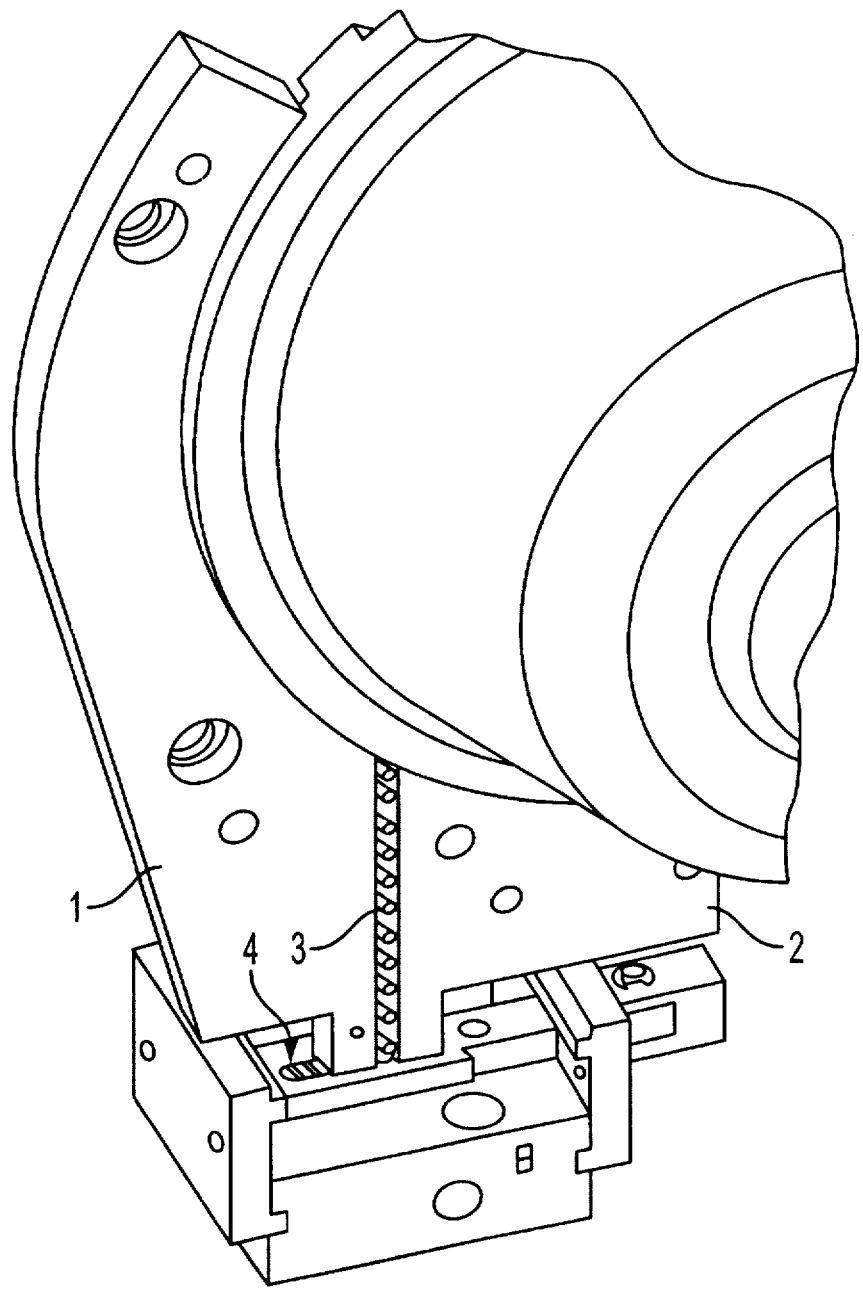
FIG. 5 is a perspective view of the separating device according to the present invention which is connected to a rotating magazine.
Figure 6:
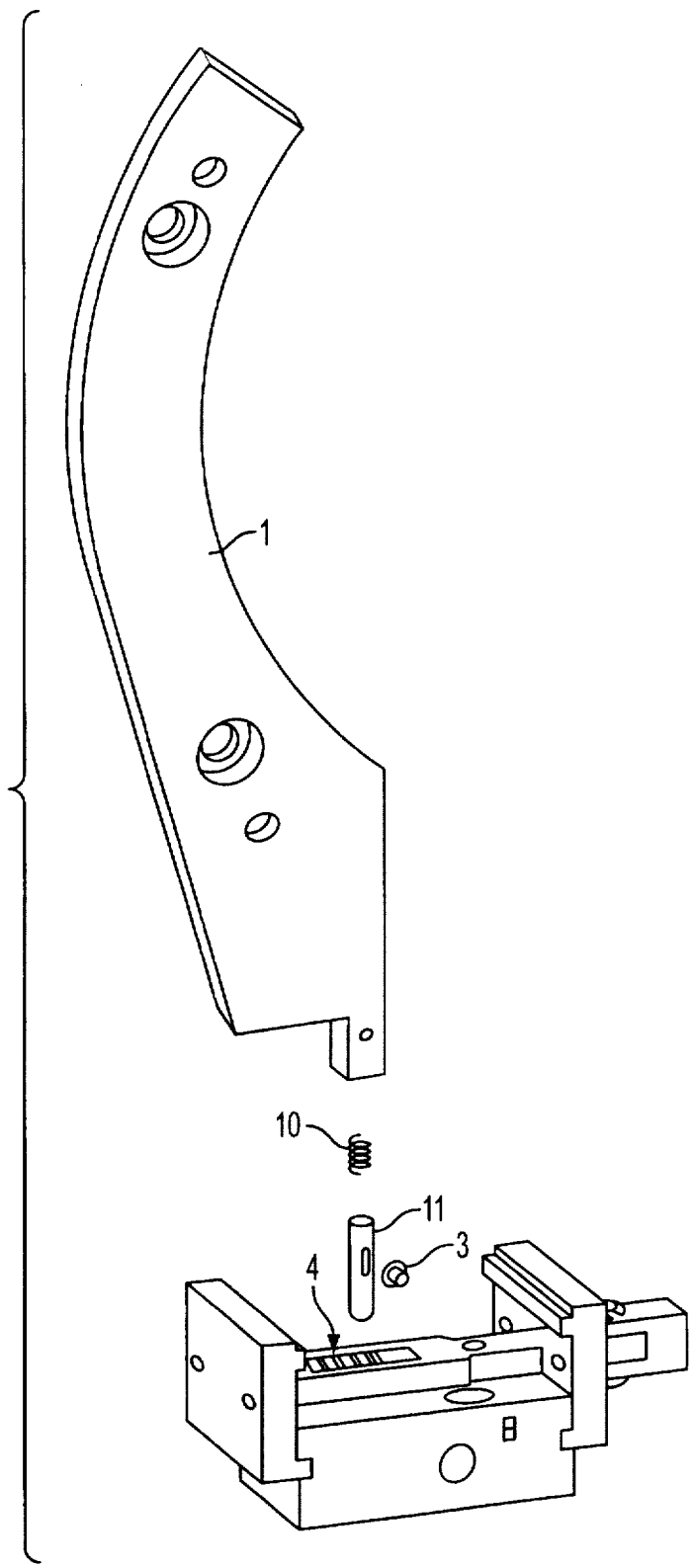
FIG. 6 is an exploded view of the separating device according to the present invention illustrated in FIG. 5.

FIG. 5 shows a perspective view of the separating device according to the invention as attached to a rotating magazine. FIG. 6 shows an exploded view of the at least one guide segment 1, the helical spring 10, the pin 11, a rivet 3 and the friction face 4.

In general, the above identified embodiments are not to be construed as limiting the breadth of the present invention. It is understood that the present invention may be modified or have other alternative constructions that are apparent from and within the scope of the present invention as defined in the appended claims.

1. A separating device for connection to a rotating magazine having a conveyor duct (6) for transporting rivets (3) comprising:
   a. a base plate (5) defining a first limiting face of the conveyor duct;
   b. a right-hand guide segment (1) defining a second limiting face of the conveyor duct;
   c. a left-hand guide segment (2) defining a third limiting face, wherein one of the guide segments is shiftable and oscillated, whereby a wedged rivet (3) can be released from its wedged position;
   d. the conveyor duct (6) is T-shaped in design;
   e. a mechanical means is connected to at least one guide segment (1, 2) to cause it to oscillate; and
   f. the mechanical means has a friction face (4) with a corrugated surface profile to be engaged by a spring-biased pin (11) mounted in one of the guide segments.

2. The separating devise claimed in claim 1 wherein:
   the pin (11) is shiftable responsive to a lateral movement of the pin (11) over the corrugated surface profile of the friction face (4) which is moving longitudinally, whereby the pin (11) will cause at least one of the guide segments (1, 2) to oscillate.

3. A separating device for connection to a rotating magazine having a conveyor duct (6) for transporting rivets (3) comprising:
   a. a base plate (5) defining a first limiting face of the conveyor duct;
   b. a right-hand guide segment (1) defining a second limiting face of the conveyor duct;
   c. a left-hand guide segment (2) defining a third limiting face;
   d. the conveyor duct (6) is T-shaped in design;
   e. a slide adapted to receive the rivets (3) from the conveyor duct (6), and positioned immediately below the right-hand guide segment (1) and the left-hand guide segment (2);
   f. the slide having a ribbed surface (4) opposite one of the guide segments (1, 2); and
   g. a projection formed on the said one of the guide segments (1, 2) in superposition to and in engagement with the ribbed surface (4) to cause oscillation of the guide segments (1, 2) whereby a wedged rivet (3) can be released from its wedge position.

* * * * *